US012645849B2

(12) United States Patent
Stepp et al.

(10) Patent No.: US 12,645,849 B2
(45) Date of Patent: Jun. 2, 2026

(54) REMAINING USEFUL LIFE PREDICTIONS USING DIGITAL-TWIN SIMULATION MODEL

(71) Applicant: The Boeing Company, Chicago, IL (US)

(72) Inventors: Nigel D. Stepp, Santa Monica, CA (US); Alexander N. Waagen, San Jose, CA (US); Tsai-Ching Lu, Thousand Oaks, CA (US)

(73) Assignee: The Boeing Company, Arlington, VA (US)

( * ) Notice: Subject to any disclaimer, the term of this patent is extended or adjusted under 35 U.S.C. 154(b) by 1128 days.

(21) Appl. No.: 17/684,868

(22) Filed: Mar. 2, 2022

(65) Prior Publication Data

US 2022/0398360 A1    Dec. 15, 2022

Related U.S. Application Data

(60) Provisional application No. 63/210,584, filed on Jun. 15, 2021.

(51) Int. Cl.
*G06F 30/20*      (2020.01)
*G06F 111/08*     (2020.01)

(52) U.S. Cl.
CPC .......... *G06F 30/20* (2020.01); *G06F 2111/08* (2020.01)

(58) Field of Classification Search
CPC ...................................................... G06F 30/20
USPC ........................................................ 703/8
See application file for complete search history.

(56) References Cited

U.S. PATENT DOCUMENTS

2021/0287459 A1 * 9/2021 Cella .................... G07C 5/0808

OTHER PUBLICATIONS

Telemetry_2021_WURC (downloaded from Wikipedia Archive dated May 19, 2021) (Year: 2021).*
Grieves_2016 (Origins of the Digital Twin Concept, Working Paper, Aug. 2016) (Year: 2016).*
Simio_2025 (Digital Twin Evolution: A 30-year Journey That Changed Industry), (Year: 2025).*
Wiecki_2013 (HDDM: Hierarchical Bayesian estimation of the Drift-Diffusion Model in Python, Frontiers in Neuroinformatics, 2013). (Year: 2013).*

(Continued)

*Primary Examiner* — Brian S Cook
(74) *Attorney, Agent, or Firm* — Alleman Hall LLP

(57) ABSTRACT

A method for remaining useful life prediction includes generating parameter data related to a performance of an electro-mechanical element. The method includes generating simulated behavior data of the electro-mechanical element by executing a digital-twin simulation model based on estimated operating conditions, and generating deviation data that characterizes how the parameter data deviates from the simulated behavior data. The deviation data includes a deterministic component and a stochastic component. The method includes generating extrapolated deviation data by extrapolating the deterministic component and the stochastic component of the deviation data forward in time, calculating a remaining useful life of the electro-mechanical element in response to the extrapolated deviation data, and reporting the remaining useful life to a person associated with the vehicle.

20 Claims, 11 Drawing Sheets

(56) References Cited

OTHER PUBLICATIONS

Gardner_1959 (Method for the Analysis of Multicomponent Exponential Decay Curves, The Journal of Chemical Physics, 1959). (Year: 1959).*

Silva_2020 (Extrapolation of AR models using cubic splines for damage progression evaluation in composite structures, Oct. 2020). (Year: 2020).*

Pang_2020 (A Bayesian Inference for Remaining Useful Life Estimation by Fusing Accelerated Degradation Data and Condition Monitoring Data, Reliability Engineering and System Safety, available online Dec. 2020). (Year: 2020).*

\* cited by examiner

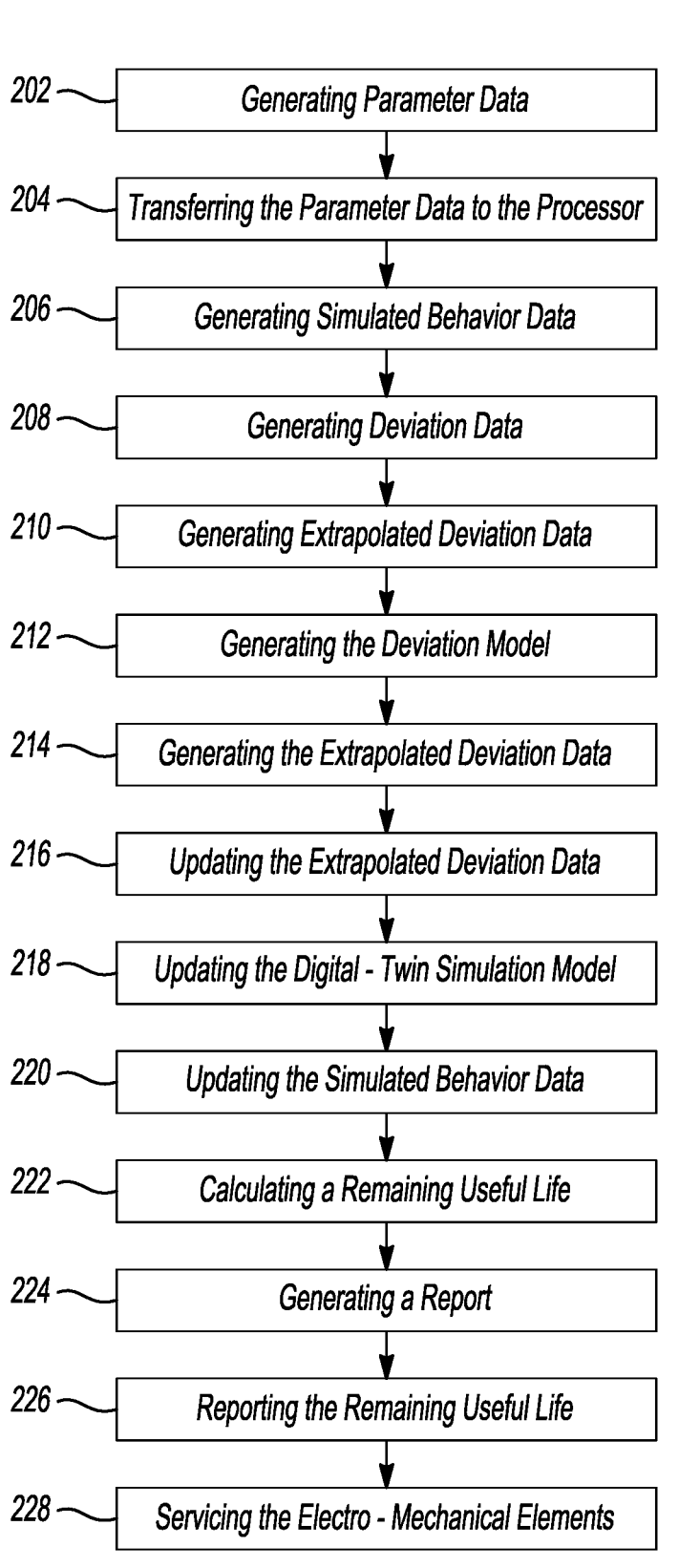

*200*

202 — Generating Parameter Data

204 — Transferring the Parameter Data to the Processor

206 — Generating Simulated Behavior Data

208 — Generating Deviation Data

210 — Generating Extrapolated Deviation Data

212 — Generating the Deviation Model

214 — Generating the Extrapolated Deviation Data

216 — Updating the Extrapolated Deviation Data

218 — Updating the Digital - Twin Simulation Model

220 — Updating the Simulated Behavior Data

222 — Calculating a Remaining Useful Life

224 — Generating a Report

226 — Reporting the Remaining Useful Life

228 — Servicing the Electro - Mechanical Elements

*Fig. 7*

REMAINING USEFUL LIFE PREDICTIONS USING DIGITAL-TWIN SIMULATION MODEL

CROSS-REFERENCE TO RELATED APPLICATION

The present application claims the benefit of priority to U.S. Provisional Application No. 63/210,584 filed Jun. 15, 2021, which is hereby incorporated by reference in its entirety.

TECHNICAL FIELD

The disclosure relates generally to useful life predictions, and in particular, to remaining useful life predictions using a digital-twin simulation model.

BACKGROUND

Components in vehicles have finite useful lives. When a group of similar components is monitored over time, differences in actual wear relative to predicted wear arise. Furthermore, differences in a degree of wear among the various components are also observed. Therefore, some existing models that attempt to predict when an individual component will reach the end of a useful life are sometimes inaccurate. The inaccuracies in the remaining useful lives make routine servicing of the vehicles inefficient.

Accordingly, those skilled in the art continue with research and development efforts in the field of predicting remaining useful life of components. As such, it would be desirable to have a method and an apparatus that takes into account at least some of the issues discussed above, as well as other possible issues.

SUMMARY

A method for remaining useful life prediction is provided herein. The method includes generating parameter data related to a performance of an electro-mechanical element of a vehicle using one or more sensors. The parameter data is acquired during a historical period. The method further includes generating simulated behavior data of the electro-mechanical element by executing in a processor a digital-twin simulation model of the electro-mechanical element based on one or more estimated operating conditions of the electro-mechanical element, and generating deviation data that characterizes how the parameter data deviates from the simulated behavior data during the historical period. The deviation data includes a deterministic component and a stochastic component. The method includes generating extrapolated deviation data by extrapolating the deterministic component and the stochastic component of the deviation data forward in time after the historical period, calculating a remaining useful life of the electro-mechanical element in response to the extrapolated deviation data, and reporting the remaining useful life to a person associated with the vehicle.

In one or more embodiments, the method includes generating a deviation model based on the extrapolated deviation data, and updating the deviation data based on the deviation model.

In one or more embodiments, the method includes updating the digital-twin simulation model based on the deviation data as updated, and updating the simulated behavior data with the digital-twin simulation model as updated.

In one or more embodiments of the method, the historical period spans a plurality of trips of the vehicle.

In one or more embodiments of the method, the deterministic component characterizes a drift of the performance of the electro-mechanical element over time, and the stochastic component characterizes a diffusion of the performance of the electro-mechanical element over time.

In one or more embodiments, the method includes servicing the electro-mechanical element based on the remaining useful life as reported.

In one or more embodiments of the method, the vehicle comprises an aircraft.

In one or more embodiments of the method, the generating of the extrapolated deviation data includes generating a plurality of extrapolated data sets by extrapolating the deviation data forward in time after the historical period using a plurality of extrapolation techniques, and selecting the extrapolated deviation data from one of the plurality of extrapolated data sets.

In one or more embodiments of the method, the selecting of the extrapolated deviation data establishes a plurality of endpoints in the plurality of extrapolated data sets.

A prediction system is provided herein. The prediction system includes one or more sensors and a processor. The one or more sensors are configured to generate parameter data related to a performance of an electro-mechanical element of a vehicle. The parameter data is acquired during a historical period. The processor is in communication with the one or more sensors. The processor is configured to generate simulated behavior data of the electro-mechanical element by executing a digital-twin simulation model of the electro-mechanical element based on one or more estimated operating conditions of the electro-mechanical element, and generate deviation data that characterizes how the parameter data deviates from the simulated behavior data during the historical period. The deviation data includes a deterministic component and a stochastic component. The processor is further configured to generate extrapolated deviation data by extrapolating the deterministic component and the stochastic component of the deviation data forward in time after the historical period, calculate a remaining useful life of the electro-mechanical element in response to the extrapolated deviation data, and report the remaining useful life to a person associated with the vehicle.

In one or more embodiments of the prediction system, the processor is configured to generate a deviation model based on the extrapolated deviation data, and update the deviation data based on the deviation model.

In one or more embodiments of the prediction system, the processor is configured to update the digital-twin simulation model based on the deviation data as updated, and update the simulated behavior data with the digital-twin simulation model as updated.

In one or more embodiments of the prediction system, the vehicle is an aircraft, and the historical period spans a plurality of flights of the aircraft.

In one or more embodiments of the prediction system, the processor is disposed inside the vehicle.

In one or more embodiments of the prediction system, the processor is disposed external to the vehicle.

A method for remaining useful life prediction is provided herein. The method includes generating parameter data related to a performance of an electro-mechanical element of a vehicle using one or more sensors. The parameter data is acquired during a historical period. The method further includes generating simulated behavior data of the electro-mechanical element by executing in a processor a digital-twin simulation model of the electro-mechanical element based on one or more estimated operating conditions of the electro-mechanical element, and generating deviation data that characterizes how the parameter data deviates from the simulated behavior data during the historical period. The deviation data includes a deterministic component and a stochastic component. The method further includes generating a plurality of extrapolated data sets by extrapolating the deterministic component and the stochastic component of the deviation data forward in time after the historical period using a plurality of extrapolation techniques, selecting extrapolated deviation data from one of the plurality of extrapolated data sets, calculating a remaining useful life of the electro-mechanical element in response to the extrapolated deviation data, and reporting the remaining useful life to a person associated with the vehicle.

In one or more embodiments of the method, the extrapolated deviation data is fit to the parameter data using a cubic spline technique.

In one or more embodiments of the method, the plurality of extrapolation techniques includes generating the extrapolated deviation data forward in time by continuing with decay a curve established by the deviation data in the historical period.

In one or more embodiments of the method, the plurality of extrapolation techniques includes generating the extrapolated deviation data forward in time by asymptotically matching one or more of the deterministic component and the stochastic component to a straight line through the deviation data with a zero slope.

In one or more embodiments of the method, the plurality of extrapolation techniques includes generating the extrapolated deviation data forward in time by asymptotically matching one or more of the deterministic component and the stochastic component to a straight line through the deviation data with a non-zero slope.

The above features and advantages, and other features and advantages of the present disclosure are readily apparent from the following detailed description of the best modes for carrying out the disclosure when taken in connection with the accompanying drawings.

BRIEF DESCRIPTION OF THE DRAWINGS

FIG. 7 is a flow diagram of a method for a remaining useful life prediction in accordance with one or more exemplary embodiments.

DETAILED DESCRIPTION

Figure 1:
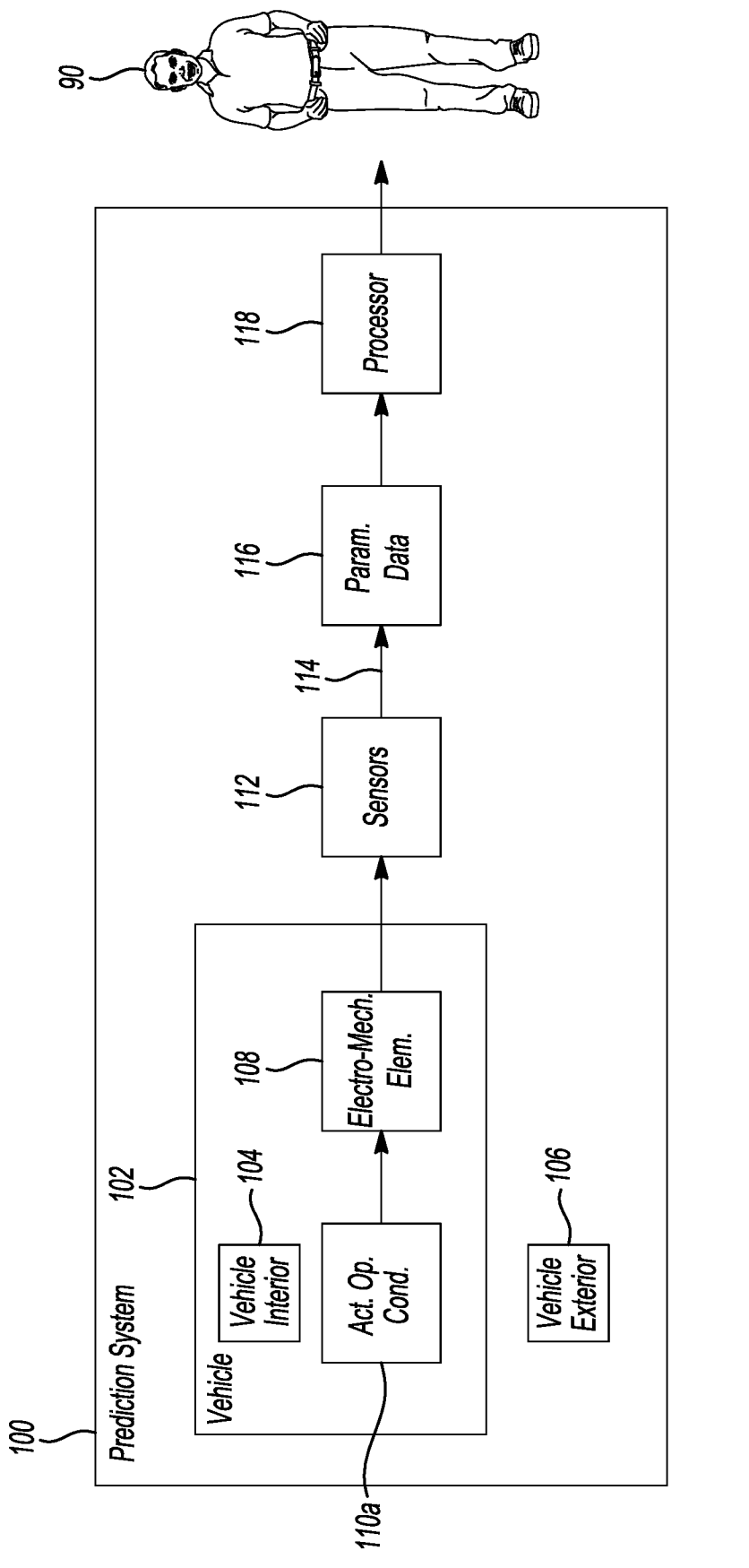
FIG. 1 is a schematic diagram of a prediction system in accordance with one or more exemplary embodiments.

This disclosure is susceptible of embodiments in many different forms. Representative embodiments of the disclosure are shown in the drawings and will herein be described in detail with the understanding that these embodiments are provided as an exemplification of the disclosed principles, not limitations of the broad aspects of the disclosure. To that extent, elements and limitations that are described, for example, in the Abstract, Background, Summary, and Detailed Description sections, but not explicitly set forth in the claims, should not be incorporated into the claims, singly or collectively, by implication, inference or otherwise.

For purposes of the present detailed description, unless specifically disclaimed, the singular includes the plural and vice versa. The words "and" and "or" shall be both conjunctive and disjunctive. The words "any" and "all" shall both mean "any and all", and the words "including," "containing," "comprising," "having," and the like shall each mean "including without limitation." Moreover, words of approximation such as "about," "almost," "substantially," "approximately," and "generally," may be used herein in the sense of "at, near, or nearly at," or "within 0-5% of," or "within acceptable manufacturing tolerances," or other logical combinations thereof. Referring to the drawings, wherein like reference numbers refer to like components.

Embodiments of the present disclosure include a method and/or an apparatus for constructing a generative deviation model that captures dynamics of wear for a particular operating history of a vehicle. The vehicle generally includes electro-mechanical elements that are measured by sensors. The sensors are in communication with a physics-based "digital twin" simulation model executing on at least one processor. The processor compares parameters of the electro-mechanical elements measured during operation with the digital-twin simulation model to determine deviations between the measured parameters and the simulated parameters. The deviations are combined with the simulated parameters to generate updated (improved) simulated behavior data. The updated simulated behavior data is used to calculate a remaining useful life (RUL) of each electro-mechanical element being monitored.

By way of example, consider an aircraft that normally operates in a hot, dry climate. Modeling deviations between measured operational data from the aircraft and a behavior predicted by the digital-twin simulation model provides a way to predict future deviations, and/or may be applied to other aircraft that operate in that same environment, even if that aircraft originally operated in a different environment. The deviation model is constructed using a drift-diffusion estimation technique, such that the deviation dynamics are split into deterministic and stochastic components. While both components are used to predict future behavior, the deterministic component is related directly to enabling a remaining useful life curve for the vehicle elements in question. Various embodiments utilize a data-driven, physics-based modeling technique to learn generative deviation models for healthy state estimations. A forecasting method generatively projects estimated drift and diffusion functions per observed data and estimated future vehicle trip profiles.

Referring to FIG. 1, a schematic diagram of an example implementation of a prediction system 100 is shown in accordance with one or more exemplary embodiments. The prediction system 100 generally includes a vehicle 102, one or more sensors 112, a link 114, and a processor 118. The vehicle 102 defines an interior 104 and an exterior 106. The vehicle 102 includes one or more electro-mechanical elements 108 that are subject to one or more actual operating conditions 110*a*. Parameter data 116 is generated by the sensors 112 and transferred to the processor 118 via the link 114. The prediction system 100 is operational to calculate a remaining useful life for one or more of the electro-mechanical elements 108 based on the parameter data 116 measured over a historical period. The remaining useful life information may be presented to a person 90. The person 90 is one or more people responsible for maintaining the vehicle 102. The maintenance includes replacing electro-mechanical elements 108 that are approaching, have reached, or have exceeded specified useful life spans.

The vehicle 102 implements a movable vehicle. The vehicle 102 is operational to make multiple trips over varying distances and in a variety of environmental conditions. In some embodiments, the vehicle 102 may be an aircraft, a boat, an automobile, a train, or the like.

Each electro-mechanical element 108 implements a device disposed in or on the vehicle 102. The electro-mechanical elements 108 are subject to measurable wear and have useful life spans. The electro-mechanical elements 108 are operational to perform a variety of functions. Examples of the electro-mechanical elements 108 include, but are not limited to, an auxiliary power generator, an environmental control system (ECS), a temperature control valve (TCV), and electrical actuators. Other types of electro-mechanical elements 108 may be implemented to meet the design criteria of a particular application.

The actual operating conditions 110*a* implement physical conditions that act upon the electro-mechanical elements 108 in time. The actual operating conditions 110*a* cause the electro-mechanical elements 108 to wear out. Example actual operating conditions 110*a* include, but are not limited to, heat, vibration, friction, pressure, torque, and strain.

The sensors 112 implement a variety of sensor types. Each sensor 112 is coupled to one or more of the electro-mechanical elements 108. In some situations, the coupling may be a direct coupling. In other situations, the coupling may be an indirect coupling. The sensors 112 are operational to generate the parameter data 116 by measuring one or more aspects of the electro-mechanical elements 108. The aspects measured by the sensors 112 are selected to provide indications of how the electro-mechanical elements 108 are aging in time. For example, a given sensor 112 may be a displacement sensor, and the corresponding electro-mechanical element 108 may be a latch having a useful life of N open/close cycles. The given sensor 112 may measure a number of times that the latch undergoes an open/closed cycle to facilitate a prediction of when the latch will reach the N open/close cycles. In another example, a particular sensor 112 may be a temperature sensor, and the electro-mechanical element 108 may be a motor that runs hotter with age. The temperature sensor may measure the operating temperature of the motor to aid in predicting when the motor will become sufficiently hot to become unusable.

The link 114 implements a communication link. The link 114 is operational to transfer the parameter data 116 from the sensors 112 to the processor 118. The link 114 may include one or more hardwired cables, one or more wireless connections, and/or one or more optical cables. Other types of communication links may be implemented to meet a design criteria of a particular application.

The parameter data 116 implements data that characterizes the operations of the electro-mechanical elements 108 as measured by the sensors 112. The parameter data 116 is carried by the link 114 from the sensors 112 to the processor 118. In various situations, the parameter data 116 may include data updated periodically (e.g., the temperature of the motor). In other situations, the parameter data 116 may include data updated in response to a triggering event (e.g., a movement of the latch from closed to open).

The processor 118 implements one or more processors. The processor 118 is operational to calculate a remaining useful life prediction for each electro-mechanical element 108 being monitored by the prediction system 100. Calculations for the remaining useful life prediction generally include a deviation modeling process that utilizes a drift-diffusion approach. The processor 118 may include, or be connected to memory to store a digital-twin simulation model, a deviation module, an extrapolation module, an updated digital-twin simulation model, a prognostics module, estimated operating conditions, and the parameter data 116. In various embodiments, the memory may include volatile memory and non-transitory (e.g., nonvolatile) memory.

An initial step of the deviation modeling process is to use the digital-twin simulation model for a series of system operations over time. The digital-twin simulations use estimated versions of the actual operating conditions 110*a* as input data, and produce expected healthy behavior of the electro-mechanical elements 108. A difference between the predicted healthy behavior and actual behavior provides a measure of deviation (x(t)) over time. The deviation is modeled to extrapolate the remaining useful lives of the electro-mechanical elements 108.

Given a measure of the deviation over time, the dynamics that govern the deviations are determined. Each dynamic, d(x), is considered a combination of a deterministic drift component, following from continued wear, along with stochastic fluctuations. The drift-diffusion approach determines the dynamics as a function of the two components. A form of the drift-diffusion evolution follows a stochastic differential equation provided by equation 1 as follows:

$$d(x)=g(x,t)dt+h(x,t)dW_t \qquad (1)$$

where x is the system deviation, $W_t$ is a standard Wiener process, t is time, g(x,t) is the deterministic component, and h(x,t) is the stochastic component.

A kernel-based regression approach is used for estimating g(x,t) and h(x,t) directly from data. The kernel-based regression approach results in numerical estimates for values of g(x,t) and h(x,t). A reasonable simplification is to assume that the dynamics do not change over time, and so g(x,t) and h(x,t) are simplified to g(x) and h(x).

Figure 2:
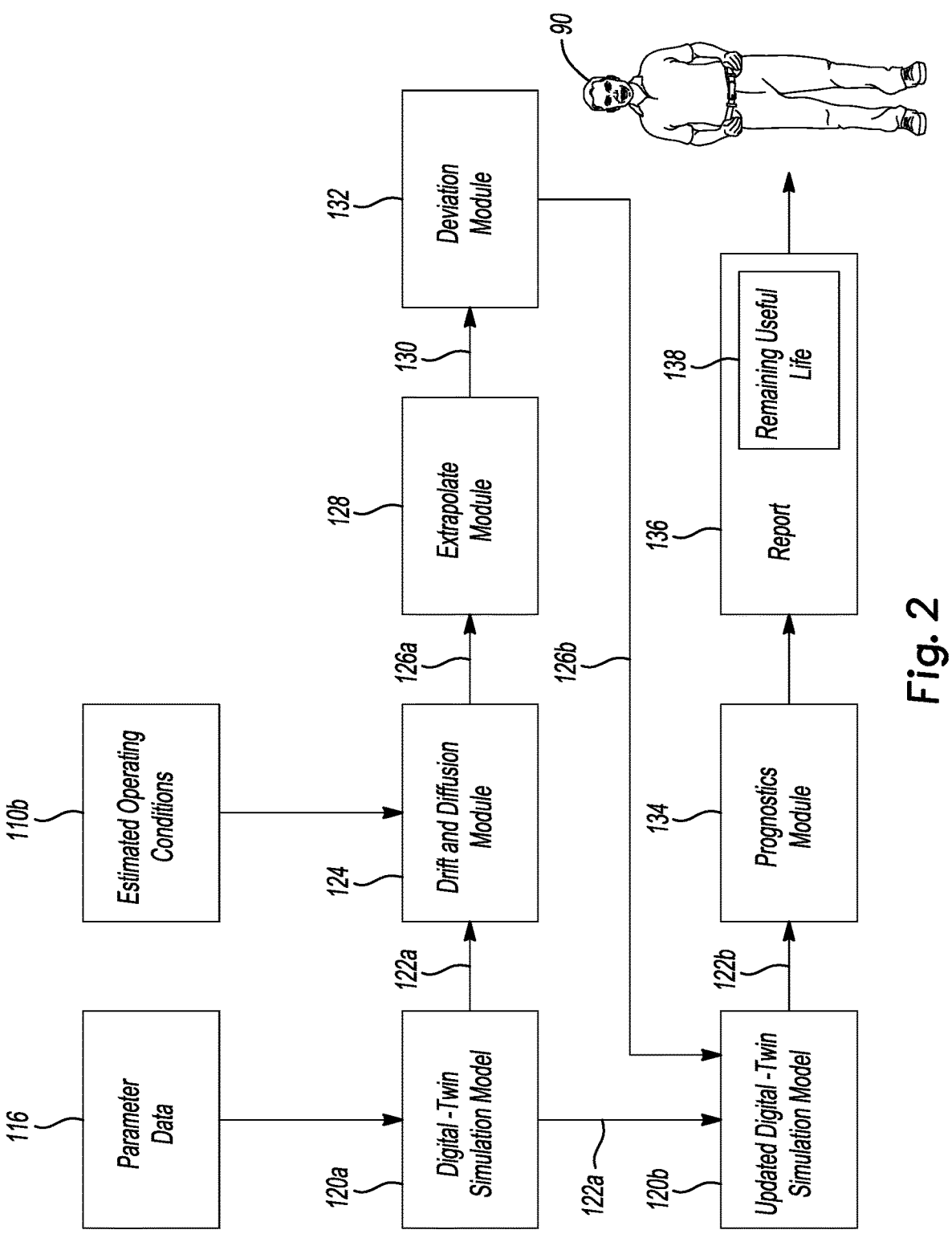
FIG. 2 is a schematic diagram of modules within a processor in accordance with one or more exemplary embodiments.

Referring to FIG. 2, a schematic diagram of example modules within the processor 118 is shown in accordance with one or more exemplary embodiments. The functions generally include a digital-twin simulation model 120a, a drift and diffusion module 124, an extrapolate module 128, a deviation model 132, an updated digital-twin simulation model 120b, and a prognostics module 134. The functions may by implemented as software modules executing in (or by) the processor 118. The processor 118 may receive as input data the parameter data 116 generated by the sensors 112, and estimated operating conditions 110b that simulate the actual operating conditions 110a of the electro-mechanical elements 108.

The digital-twin simulation model 120a implements a physics-based model. The digital-twin simulation model 120a is operational to estimate the aging of the electro-mechanical elements 108 as a function of time. The estimations are based on the estimated operating conditions 110b, physical characteristics of the electro-mechanical elements 108, and time. The digital-twin simulation model 120a is operational to generate simulated behavior data 122a. The simulated behavior data 122a provides estimations of the parameter data 116 provided by the sensors 112.

The drift and diffusion module 124 implements a kernel-based regression technique. The drift and diffusion module 124 receives the parameter data 116 for the electro-mechanical elements 108, and the simulated behavior data 122a from the digital-twin simulation model 120a. The drift and diffusion module 124 is operational to generate deviation data 126a as differences between what the predicted behavior generated by the digital-twin simulation model 120a and the actual behavior measured by the sensors 112. The deviation data 126a includes the deterministic components g(x) and the stochastic components h(x) of the deviations.

The extrapolate module 128 implements one or more extrapolation operations. The extrapolate module 128 is configured to predict the deviation data in larger value ranges. For a range of data covered by the historical data, a cubic spline technique may be used to fit the functions. Outside the range of the historical data, conditions may be presented for choosing between three different extrapolation functions. The extrapolated values are presented as extrapolated deviation data 130 to the deviation model 132.

The deviation model 132 implements a simulation model that characterizes drift and diffusion in the data. The deviation model 132 is operational to generate updated deviation data 126b based on a combination of the extrapolated deviation data 130 and the simulated behavior data 122a. The updated deviation data 126b is subsequently utilized to improve the digital-twin simulation model 120a.

The updated digital-twin simulation model 120b utilizes the updated (improved) deviation data 126b to generate improved remaining useful life predictions. The improved remaining useful life predictions are presented as updated simulated behavior data 122b to the prognostics module 134.

The prognostics module 134 is operational to predict the remaining useful lives 138 of the electro-mechanical elements 108 based on the updated simulated behavior data 122b. In various embodiments, the prognostics module 134 may compare the updated simulated behavior data 122b of each electro-mechanical element 108 against respective thresholds that define when the electro-mechanical elements 108 should be replaced. A report 136 containing the remaining useful lives 138 may be generated by the prognostics module 134 and transferred to the person 90.

Given estimates of deterministic components g(x) and the stochastic components h(x) from the drift and diffusion module 124, the deviations from some initial conditions may be generated forward in time by integrating in the extrapolate module 128. Since the deterministic components g(x) and the stochastic components h(x) are discovered empirically, the components are established solely over a range of historical data available during the estimation. In order to generate beyond the historical data range, values of g(x) and h(x) are extrapolated to cover a longer range. Considering that g(x) is a phase portrait, reasonable assumptions may be made about the properties of the extrapolation functions. For instance, artificially created fixed-points may be avoided without good reason, and premature divergence may also be avoided in the predictions. Using the two assumptions, the extrapolated endpoints of g(x) fall into three cases. In a first case, the extrapolation continues to follow an existing curvature, but decays to avoid curving in on itself. In a second case, the extrapolation follows an asymptote, commonly at g(x)=0. A third case has the asymptote along a line g(x)=αx, where α≠0 instead of zero. The first case is satisfied by fitting the following function to an endpoint value (z), a first derivative (m), and a second derivative (k) per equation 2 as follows:

$$\hat{g}(x)=a+bx+ce^{-x} \tag{2}$$

$$a=-kx^*-k-mx^*+z$$

$$b=k+m$$

$$c=ke^{x^*}$$

where x* is the location of the right endpoint. The left endpoint is extrapolated using g(−x) and −x*.

In the second case, the asymptote at g(x)=0 is forced by multiplying by e^{−x}. As such, equation 2 may be converted to equation 3 as follows:

$$\hat{g}(x)=e^{-x}(a+bx+ce^{-x}) \tag{3}$$

$$a=-(kx^*+2zx^*+3mx^*+k+2m)e^{x^*}$$

$$b=(k+2z+3m)e^{x^*}$$

$$c=(k+z+2m)e^{2x^*}$$

The third case is appropriate where (i) g(x*)<0 and g'(x*)<0, or g(x*)>0 and g'(x*)>0 for a left endpoint, and (ii) g(x*)>0 and g'(x*)<0, or g(x*)<0 and g'(x*)>0 for a right endpoint. In such a case, a simple decay may be used per equation 4 as follows:

$$\hat{g}(x)=ze^{-x+x^*}-ma(x+x^*) \tag{4}$$

The cases are appropriate for the following endpoints. For the left endpoint, if sgn(g)≠sgn(g')=sgn(g''), then use equation 3 if equation 4 is not appropriate. For the right endpoint, if sgn(g)=sgn(g')≠sgn(g''), then use equation 3 if equation 4 is not appropriate. Otherwise use equation 2 in other cases, where "sgn" is the sign function, or the signum function.

Figures 3, 4:
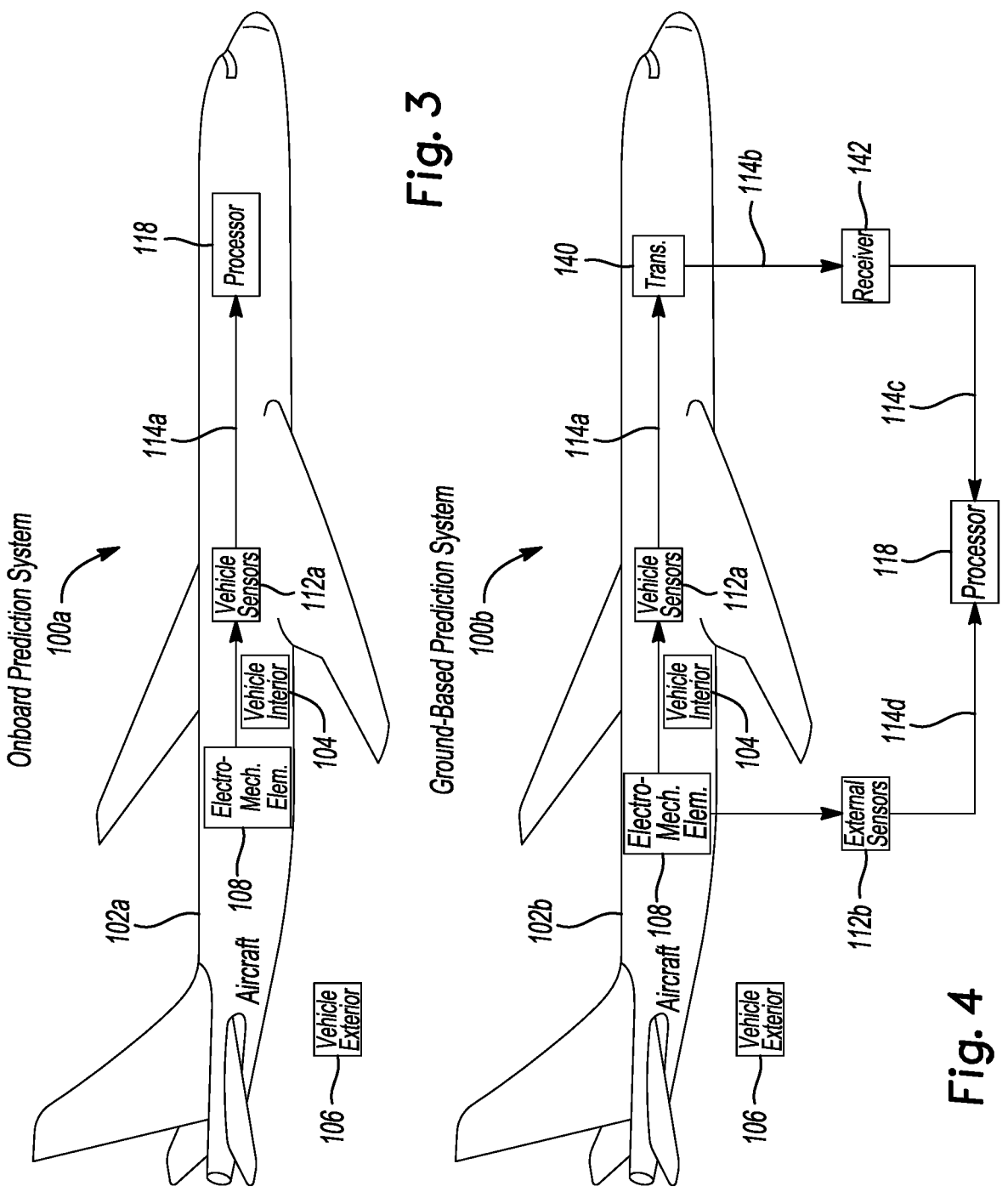
FIG. 3 is a schematic diagram of an onboard prediction system in accordance with one or more exemplary embodiments.
FIG. 4 is a schematic diagram of a ground-based prediction system in accordance with one or more exemplary embodiments.

Referring to FIG. 3, a schematic diagram of an example implementation of an onboard prediction system (OBS) 100a is shown in accordance with one or more exemplary embodiments. The onboard prediction system 100a may be a variation of the prediction system 100. The vehicle 102 of the onboard prediction system 100a may be an aircraft 102a. The electro-mechanical elements 108, vehicle sensors 112a, a hardwired link 114a, and the processor 118 are disposed on the interior 104 of the aircraft 102*a*. The vehicle sensors 112*a* may be a variation of the sensors 112. The hardwired link 114*a* may be variation of the link 114.

While the aircraft 102*a* is powered, the vehicle sensors 112*a* may measure the parameter data 116 (see FIG. 1) of the electro-mechanical elements 108. The parameter data 116 is transferred to the processor 118 via the hardwired link 114*a*. The processor 118 may calculate the remaining useful lives 138 in real time while the aircraft 102*a* is powered (e.g., while in flight and while moving about on the ground). The processor 118 may generate the report 136 while the aircraft 102*a* is powered (e.g., while in flight and/or while on the ground).

Referring to FIG. 4, a schematic diagram of an example implementation of a ground-based prediction system 100*b* is shown in accordance with one or more exemplary embodiments. The ground-based prediction system 100*b* may be a variation of the prediction system 100. The vehicle 102 of the ground-based prediction system 100*b* may be another aircraft 102*b*. The electro-mechanical elements 108, the vehicle sensors 112*a*, the hardwired link 114*a*, and a transmitter 140 are disposed on the interior 104 of the aircraft 102*b*. One or more external sensors 112*b*, a processor link 114*c*, a sensor link 114*d*, the processor 118, and a receiver 142 may be located external to the aircraft 102*b*. A communication link 114*b* may be created between the transmitter 140 and the receiver 142.

The external sensors 112*b* implement a variety of sensor types. Each external sensor 112*b* is indirectly coupled to one or more of the electro-mechanical elements 108. The external sensors 112*b* are operational to generate additional parameter data 116 by measuring one or more aspects of the electro-mechanical elements 108. The aspects measured by the external sensors 112*b* are selected to provide indications of how the electro-mechanical elements 108 are aging in time.

The communication link 114*b* may include one or more wired communication links and/or one or more wireless communication links. The communication link 114*b* is operational to transfer the parameter data 116 from the transmitter 140 inside the aircraft 102*b* to the receiver 142 outside the aircraft 102*b*.

The processor link 114*c* may provide data communications between the receiver 142 and the processor 118. The processor link 114*c* is operational to transfer the parameter data 116 from the receiver 142 to the processor 118.

The sensor link 114*d* may include one or more wired communication links and/or one or more wireless communication links. The sensor link 114*d* is operational to transfer the parameter data 116 generated by the external sensors 112*b* to the processor 118.

While the aircraft 102*b* is powered, the vehicle sensors 112*a* and the external sensors 112*b* may measure the parameter data 116 (see FIG. 1) of the electro-mechanical elements 108. The parameter data 116 is transferred to the processor 118 via the links 114*a*-114*d*. The processor 118 may calculate the remaining useful lives 138 in real time based on the vehicle sensors 112*a* while the aircraft 102*b* is powered and in motion (e.g., while in flight and/or while moving about on the ground). The processor 118 may calculate the remaining useful lives 138 based on the vehicle sensors 112*a* and the external sensors 112*b* while the aircraft 102*b* is powered and stationary approximate the external sensors 112*b*. The processor 118 may generate the report 136 after the parameter data 116 has been gathered.

Figures 5, 6:
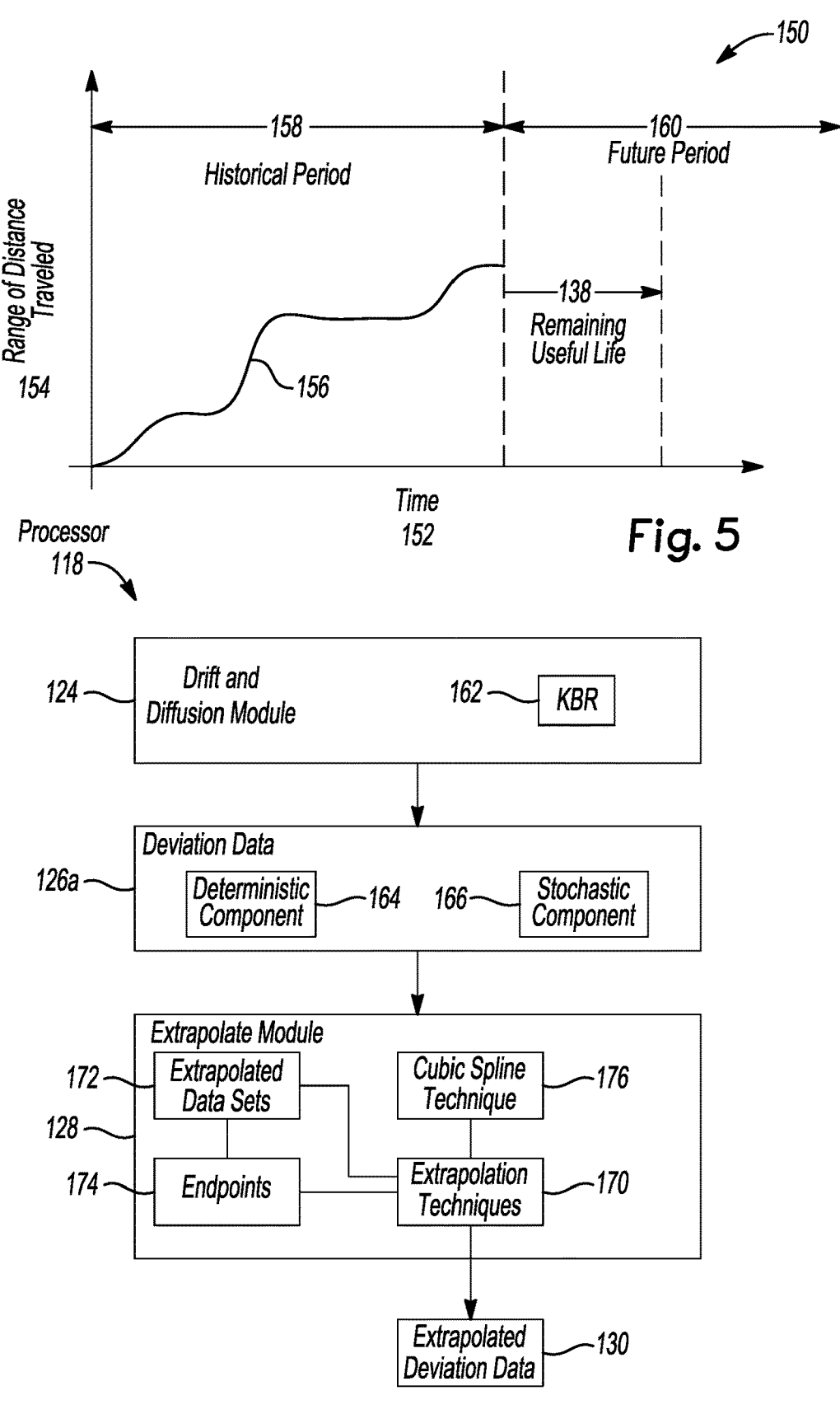
FIG. 5 is a graph of a timeline of a vehicle in accordance with one or more exemplary embodiments.
FIG. 6 is a detailed schematic diagram of a portion of the modules within the processor in accordance with one or more exemplary embodiments.

Referring to FIG. 5, a graph 150 of an example timeline of the vehicle 102 is shown in accordance with one or more exemplary embodiments. A first axis 152 of the graph 150 may indicate elapsed time. A second axis 154 of the graph 150 illustrates a range of a distance traveled by the vehicle 102. A curve 156 illustrates an example total distance traveled over a number of trips (e.g. a plurality of trips/ flights).

The electro-mechanical elements 108 elements of the vehicle 102 generally wear due to movement of the vehicle 102. As the vehicle 102 moves during the trips, a current value of the curve 156 increases. The sensors 112 measure the parameter data 116 during a historical period 158. The parameter data 116 is presented to the processor 118. In most situations, the processor 118 calculates the remaining useful life 138 of each electro-mechanical element 108 being monitored by extrapolating the deviations forward in time into a future period 160 after the historical period 158 ends. In some situations, an electro-mechanical element 108 may be calculated to have reached a remaining useful life 138 during the historical period 158.

Referring to FIG. 6, a detailed schematic diagram of a portion of the modules within the processor 118 is shown in accordance with one or more exemplary embodiments. The drift and diffusion module 124 may implement a kernel-based regression technique 162. The kernel-based regression technique 162 is operational to perform a kernel-based regression to generate the deterministic component 164 and the stochastic component 166 of the deviation data 126*a*. Kernel-based regression generally determines a non-linear relationship between a pair of random variables. The kernel-based regression technique 162 may be implemented using the Nadaraya-Watson kernel regression technique, the Priestley-Chao kernel estimator technique, or the Gasser-Muller kernel estimator technique. Other kernel-based regression techniques may be implemented to meet a design criteria of a particular application.

The extrapolate module 128 implements multiple (e.g., 3) extrapolation techniques 170 that operate on the deviation data 126*a*. The multiple extrapolation techniques 170 generate multiple extrapolated data sets 172 to determine endpoints 174. The extrapolated deviation data 130 may be selected from among the extrapolated data sets 172. A cubic spline technique 176 may be used to fit the functions for the range of the parameter data 116 covered by the historical period 158. The extrapolation techniques 170 may include, but are not limited to, a continuation of the deviation data 126*a* with decay (e.g., see FIG. 10, curves 312 and 314), asymptotically match to a straight line with a zero slope (e.g., see FIG. 10, curves 316 and 318 approaching a curve 306), and asymptotically match to a straight line with a non-zero slope (e.g., see FIG. 11, curve 322 approaching a curve 308). Other extrapolation techniques may be implemented to meet a design criteria of a particular application.

Referring to FIG. 7, a flow diagram of an example implementation of a method 200 for a remaining useful life prediction is shown in accordance with one or more exemplary embodiments. The method (or process) 200 may be implemented by the prediction system 100/100*a*/100*b*. The method 200 generally includes steps 202 to 228, described below. The sequence of steps is shown as a representative example. Other step orders may be implemented to meet the criteria of a particular application.

In the step 202, the sensors 112 may generate the parameter data 116 by measuring the electro-mechanical elements 108. The parameter data 116 is transferred in the step 204 to the processor 118 via the link 114. The processor 118 generates the simulated behavior data 122*a* by executing the digital-twin simulation model 120*a* based on the estimated operating conditions 110*b* in the step 206. The drift and diffusion module 124 generates the deviation data 126*a* in the step 208 by comparing the measured parameter data 116 to the simulated behavior data 122*a*.

In the step 208, the deviation data 126*a* may be generated using the drift and diffusion module 124 based on the parameter data 116 and the simulated behavior data 122*a*. The deviation data 126*a* is extrapolated forward in time by the extrapolate module 128 in the step 210 to generate the extrapolated deviation data 130. The deviation model 132 is generated in response to the extrapolated deviation data 130 in the step 212. The deviation model 132 generates the updated deviation data 126*b* in the step 214.

The deviation model 132 generates the updated deviation data 126*b* in the step 216. In the step 218, the updated deviation data 126*b* updates the digital-twin simulation model 120*a* to generate an updated digital-twin simulation model 120*b*. The updated digital-twin simulation model 120*b* updates the simulated behavior data 122*a* in the step 220 to generate the updated simulated behavior data 122*b*. In the step 222, the remaining useful life 138 is calculated by the prognostics module 134 in response to the updated deviation data 126*b*. The prognostics module 134 subsequently generates the report 136 with the remaining useful life 138 in the step 224. The remaining useful life 138 is reported to the person 90 in the step 226. In response to the remaining useful life 138, the person 90 may service one or more of the electro-mechanical elements 108 in the step 228.

Figures 8, 10:
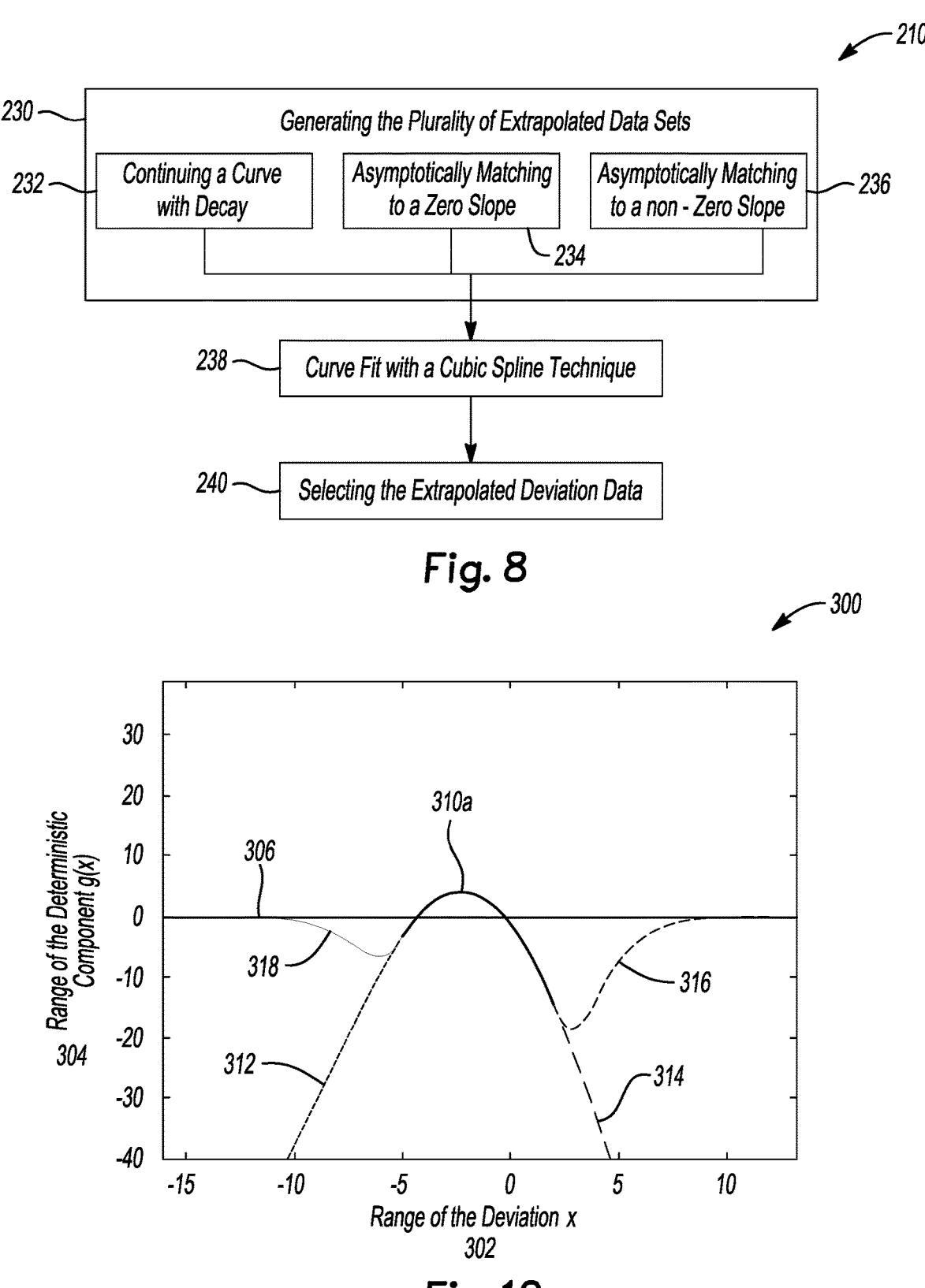
FIG. 8 is a detailed flow diagram of a step for generating extrapolated deviation data in accordance with one or more exemplary embodiments.
FIG. 10 is a graph of extrapolations in accordance with one or more exemplary embodiments.

Referring to FIG. 8, a detailed flow diagram of the step 210 for generating the extrapolated deviation data is shown in accordance with one or more exemplary embodiments. The step 210 generally includes steps 230 to 240, described below. The sequence of steps is shown as a representative example. Other step orders may be implemented to meet the criteria of a particular application.

In the step 230, the extrapolate module 128 may generate the plurality of extrapolated data sets 172 using the multiple extrapolation techniques 170. In a first extrapolation technique, a curve of the deterministic component, the stochastic component, or both components established by the deviation data 126*a* in the historical period 158, may be continued with decay in the step 232. In a second extrapolation technique, the curve may be asymptotically matched to a zero slope in the step 234. In a third extrapolation technique, the curve may be asymptotically matched to a straight line with a non-zero slope running through the deviation data in the step 236. A curve fitting may be performed in the step 238 with the cubic spline technique 176. A selection among the available extrapolated data sets 172 may be made in the step 240 to determine the resulting extrapolated deviation data 130.

Figure 9:
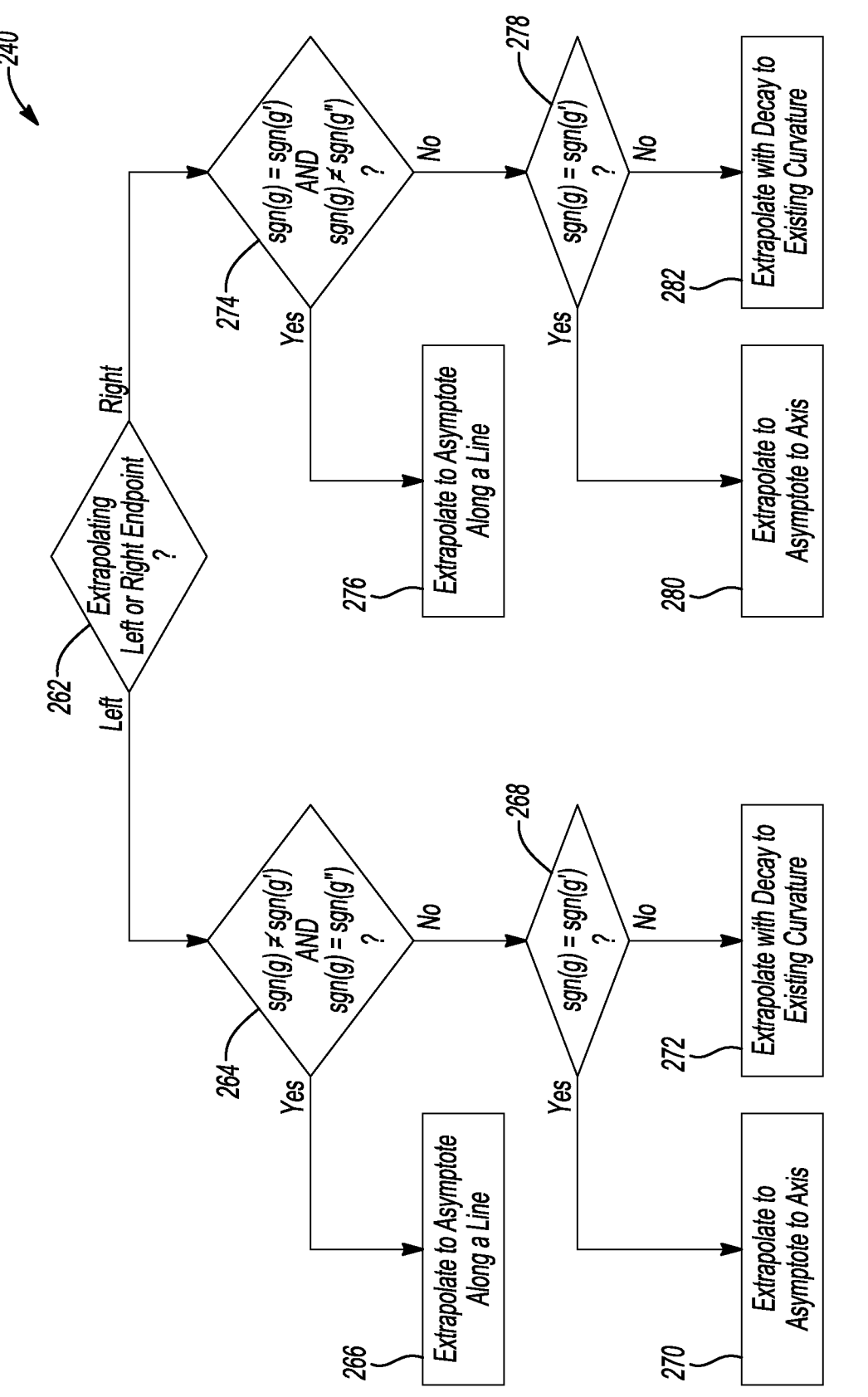
FIG. 9 is a detailed flow diagram of a step for selecting among multiple extrapolated data sets in accordance with one or more exemplary embodiments.

Referring to FIG. 9, a detailed flow diagram of the step 240 for selecting among the extrapolated data sets is shown in accordance with one or more exemplary embodiments. The step 240 generally includes steps 262 to 282, as described below. The sequence of steps is shown as a representative example. Other step orders may be implemented to meet the criteria of a particular application.

In the step 262, the extrapolate module 128 decides whether to extrapolate the left endpoint or the right endpoint. Based on the data gathered in the historical period 158, the decision in the step 262 may be case-dependent on the direction that the deviation data 126*a* is trending. In situations where the deviation data 126*a* is trending leftward, the step 262 may result in the "left" answer. In situations where the deviation data 126*a* is trending rightward, the step 262 may result in the "right" answer. For extrapolating to the left endpoint, if sgn(g)=sgn(g") and sgn(g)≠sgn(g') is true (e.g. Yes) in the step 264, extrapolate to an asymptote along a line of non-zero slope in the step 266. If the step 264 is false (e.g. No) and if sgn(g)=sgn(g') is true in the step 268, extrapolate to an asymptote along the axis in the step 270. Otherwise, extrapolate with decay to the existing curvature in the step 272.

For extrapolating to the right endpoint, if sgn(g)=sgn(g') and sgn(g)≠sgn(g") is true in the step 274, extrapolate to an asymptote along a line of non-zero slope in the step 276. If step 274 is false and if sgn(g)=sgn(g') is true in the step 278, extrapolate to an asymptote along the axis in the step 280. Otherwise, extrapolate with decay to the existing curvature in the step 282.

Referring to FIG. 10, a graph 300 of example extrapolations is shown in accordance with one or more exemplary embodiments. The graph 300 includes a first axis 302 and a second axis 304. The first axis 302 illustrates a range of the deviation x. The second axis 304 illustrates a range of the deterministic component g(x). A curve 306 illustrates a straight line (e.g., y=αx+b) of zero slope (e.g., α=0) at the value g(x)=0. The graph 300 is a demonstration of equations 2 and 3.

A curve 310*a* illustrates example values of g(x) over a range of approximately −5 to approximately 2 on the first axis 302. The deterministic component g(x) may be given by equation 5 as follows:

$$g(x)=-(x+2.3)^2+4 \qquad (5)$$

A curve 312 illustrates a left non-asymptote extrapolation that follows the curve 310*a*. A curve 314 illustrates a right non-asymptote extrapolation that follows the curve 310*a* per equation 2. A curve 316 illustrates a right asymptote extrapolation that converges with the curve 306 (e.g., g(x)=0) per equation 3. A curve 318 illustrates a left asymptote that also converges with the curve 306.

Figure 11:
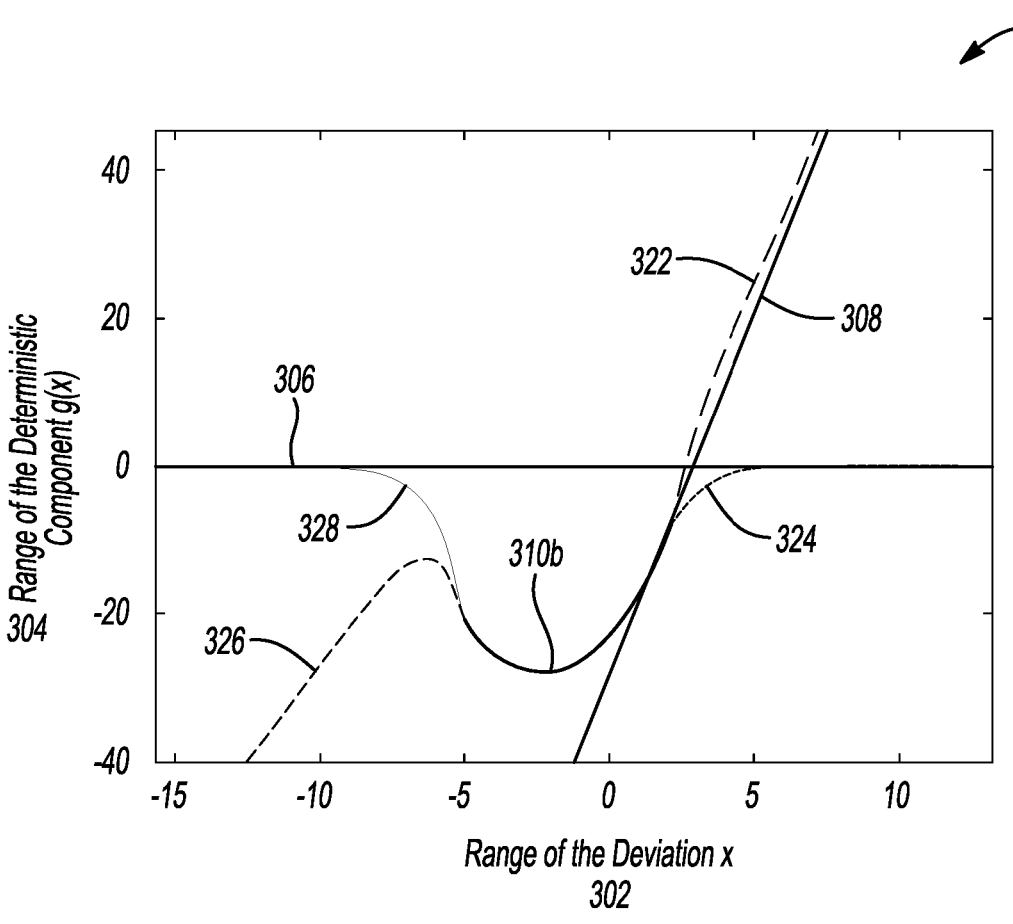
FIG. 11 is a graph of additional extrapolations in accordance with one or more exemplary embodiments.

Referring to FIG. 11, a graph 320 of additional example extrapolations is shown in accordance with one or more exemplary embodiments. The graph 320 includes the first axis 302 and the second axis 304. The first axis 302 illustrates the range of the deviation x. The second axis 304 illustrates the range of the deterministic component g(x). The curve 306 illustrates the line g(x)=0. A curve 308 illustrates a straight line (e.g., y=αx+b) of non-zero slope (e.g., α=1). The graph 320 is a demonstration of equation 4.

A curve 310*b* illustrates example values of g(x) over the range of approximately −5 to approximately 2 on the first axis 302. The deterministic component g(x) may be given by equation 6 as follows:

$$g(x)=(x+2.3)^2-28 \qquad (6)$$

A curve 322 illustrates a right decay to the curve 308. A curve 324 illustrates a right decay to the curve 306. A curve 326 illustrates a left decay (e.g., α=1). A curve 328 illustrates a left decay to the curve 306.

Figure 12:
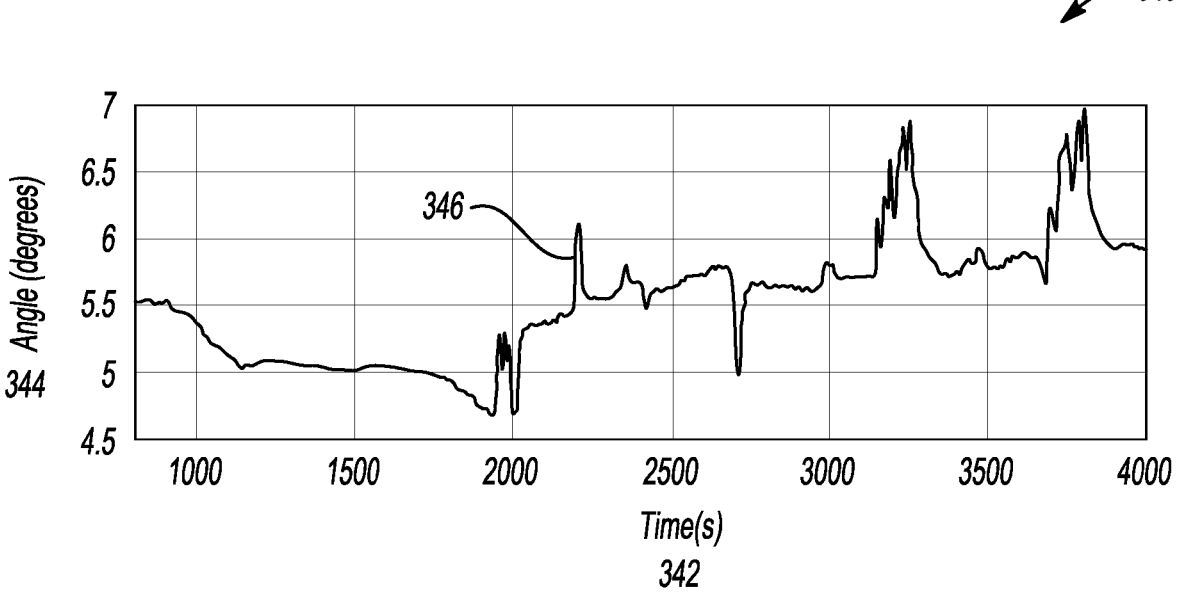
FIG. 12 is a graph of simulation behavior data for a temperature control valve angle in accordance with one or more exemplary embodiments.

Referring to FIG. 12, a graph 340 of an example simulation behavior data for a temperature control valve angle as generated by a digital-twin simulation model is shown in accordance with one or more exemplary embodiments. A first axis 342 of the graph 340 illustrates time in units of seconds. A second axis 344 of the graph 340 illustrates the angle in units of degrees. A curve 346 illustrates the parameter data 116.

The method 200 was applied to the parameter data 116 from an actual aircraft. The digital-twin simulation model 120*a* for operations of an environmental control system (ECS) was created. Using the actual aircraft flight data as input data, a simulation of the expected behavior of the environmental control system components was performed. In the example, the simulated behavior data 122a for a temperature control valve is shown as the curve 346.

Figures 13, 14:
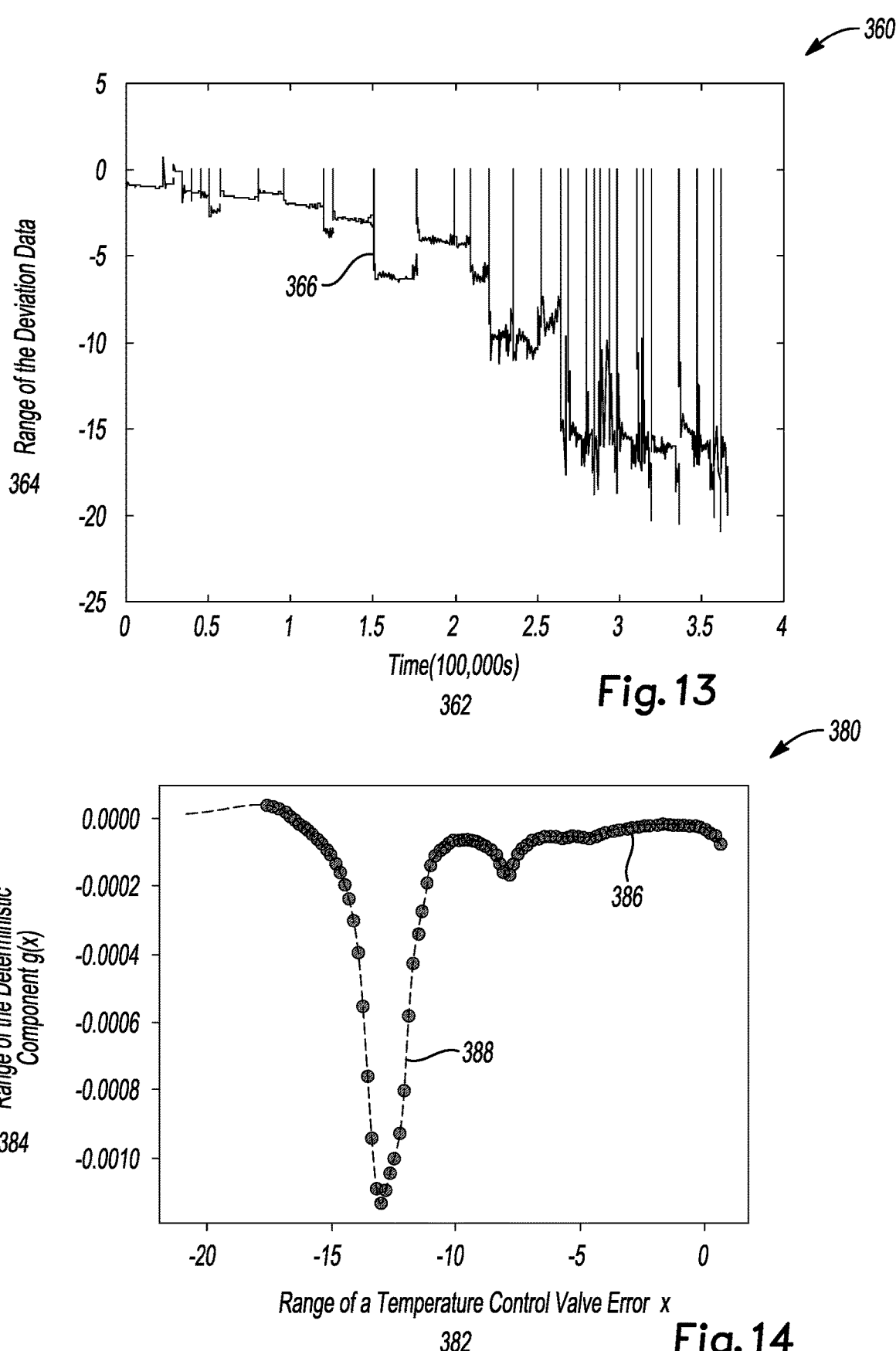
FIG. 13 is a graph of deviation data for multiple aircraft flights in accordance with one or more exemplary embodiments.
FIG. 14 is a graph of data drift in accordance with one or more exemplary embodiments.

Referring to FIG. 13, a graph 360 of an example deviation data for multiple aircraft flights is shown in accordance with one or more exemplary embodiments. The graph 360 includes a first axis 362 that illustrates time in units of 100,000 seconds. A second axis 364 of the graph 360 illustrates a range of the deviation data 126a. A curve 366 illustrates the deviation data 126a for many (e.g., 130) consecutive flights relative to the simulated behavior data 122a (e.g., the curve 346 in FIG. 12). The curve 366 shows that an error between the parameter data 116 originally recorded from the aircraft and the simulated behavior data 122a grows over time. The sudden spikes to a deviation value near zero are simulation artifacts and may be removed using a low-pass filter or other smoothing technique.

Referring to FIG. 14, a graph 380 of an example drift is shown in accordance with one or more exemplary embodiments. The graph 380 includes a first axis 382 illustrating a range of a temperature control value error x. A second axis 384 illustrates a range of the deterministic component g(x). Dots 386 illustrate the deterministic component g(x) as calculated via the kernel-based regression technique 162. The curve 388 (dashed line) illustrates the deterministic component g(x) extrapolated to a larger domain. The larger domain allows the model to go beyond the observed data Referring to FIG. 15, a graph 400 of an example diffusion is shown in accordance with one or more exemplary embodiments. The graph 400 includes the first axis 382 illustrating the range of the temperature control value error x. A second axis 404 illustrates a range of the stochastic component h(x). Dots 406 illustrate the stochastic component h(x) as calculated via the kernel-based regression technique 162. The curve 408 (dashed line) illustrates the stochastic component h(x) extrapolated to a larger domain. The larger domain allows the model to go beyond the observed data.

Figures 15, 16:
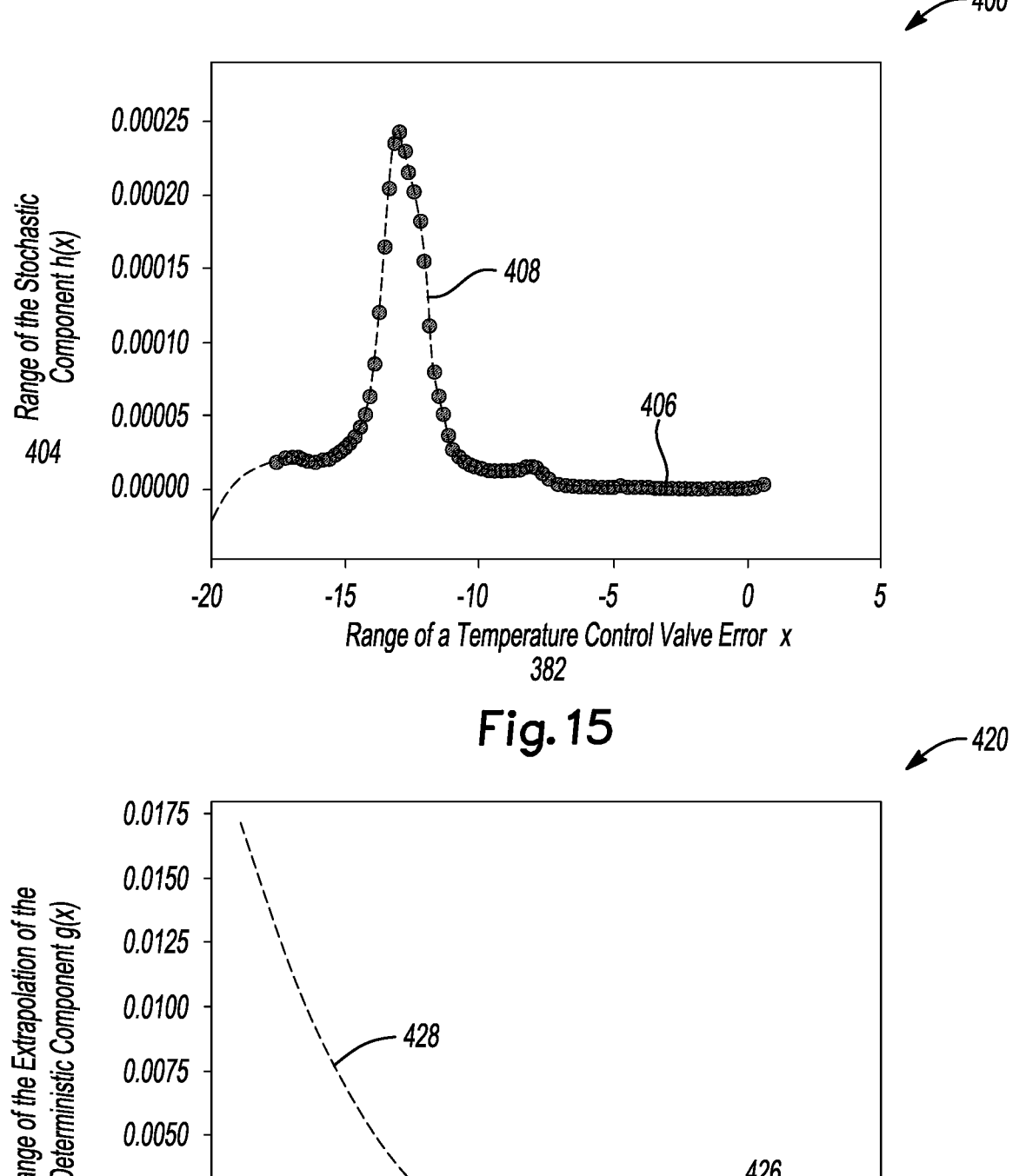
FIG. 15 is a graph of data diffusion in accordance with one or more exemplary embodiments.
FIG. 16 is a graph of a cubic spline fit in accordance with one or more exemplary embodiments.

Using the kernel-based regression technique 162, estimates were created for the deterministic component g(x) (e.g., the drift in FIG. 14) and the stochastic component h(x) (e.g., the diffusion in FIG. 15). First, kernel-based regression technique 162 was used to calculate the deterministic component g(x) and the stochastic component h(x). While running the model, values for g(x) and h(x) for x outside the range of the observed data may be helpful, either to run the model into the future or because the model attains a value near but slightly outside of the observed range. Therefore, a curve is fit to the drift and diffusion in order to extend the domains. Note that the curve fitting is used for g(x) and h(x) and not for the observed data.

Extrapolation of the estimated values of g(x) and h(x) are shown in FIGS. 14 and 15 as the dashed lines, and the extrapolation was used in the integration step to generate the prediction deviation. After many such runs, the data shows a mean and 95% confidence interval over generated trajectories. The deviation model accurately represents the temperature control value error over the observed data with an average R2 value of 0.91 over 100 independent runs. The model is simple and may be represented as a one-dimensional dynamical system, so in combination with the physics-based digital-twin simulation model 120a, a more accurate model of the temperature control value angle was produced without yielding comprehensibility. The more accurate model was subsequently used for the prediction of the temperature control value angle, which in turn, may be used as an early indication of the remaining useful life 138.

Referring to FIG. 16, a graph 420 of an example a cubic spline fit is shown in accordance with one or more exemplary embodiments. The first axis 382 of the graph 420 illustrates the range of the temperature control value error x. A second axis 424 of the graph 420 illustrates a range of the extrapolation of the deterministic component g(x). Dots 426 illustrate the deterministic component g(x) as calculated. A curve 428 (dashed line) illustrates the deterministic component g(x) extrapolated using the curve spline fit extrapolation.

Figure 17:
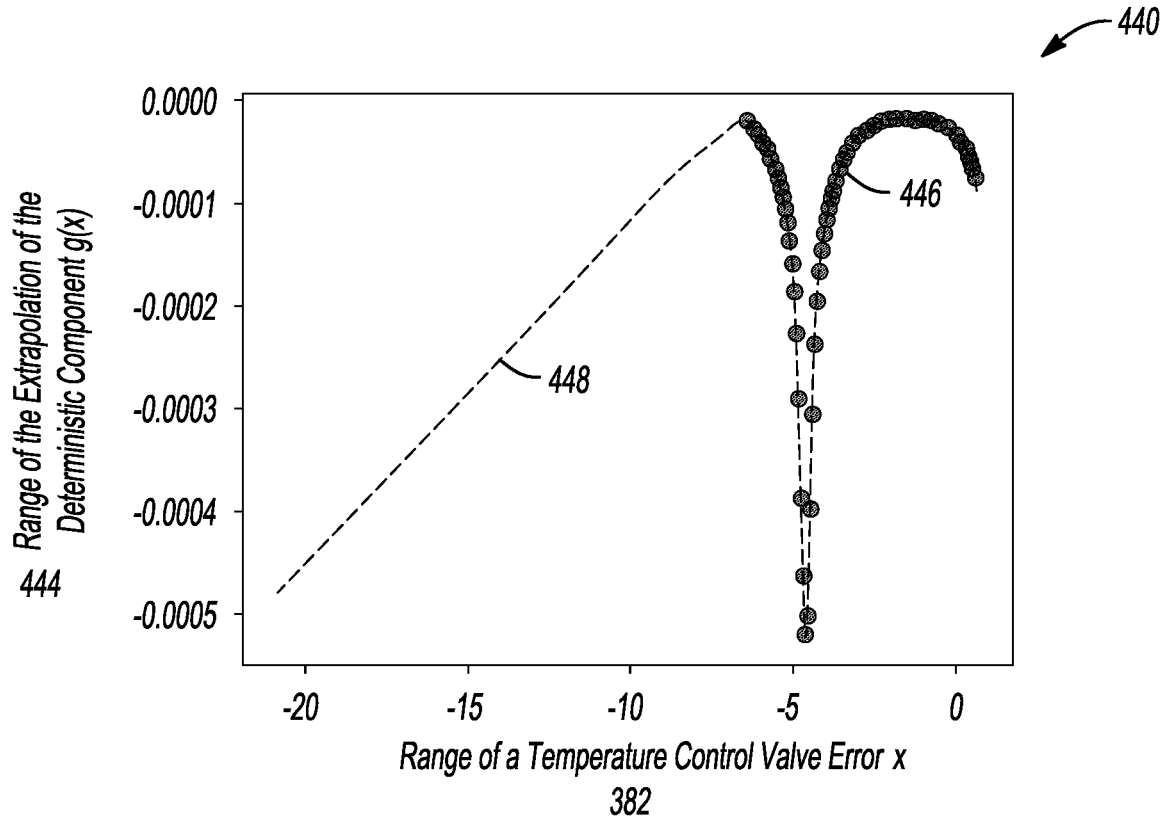
FIG. 17 is a graph of a piecewise polynomial extrapolation in accordance with one or more exemplary embodiments.

Referring to FIG. 17, a graph 440 of an example piecewise polynomial extrapolation is shown in accordance with one or more exemplary embodiments. The first axis 382 of the graph 440 illustrates the range of the temperature control value error x. A second axis 444 of the graph 440 illustrates a range of the extrapolation of the deterministic component g(x). Dots 446 illustrate the deterministic component g(x) as calculated. A curve 448 (dashed line) illustrates the deterministic component g(x) as calculated per the piecewise polynomial extrapolation. Note that the left endpoint of the curve 448 meets conditions appropriate for equation 4. The curve 448 reaches a linear state due to setting $\alpha=1$. FIGS. 16 and 17 are analogous to FIGS. 14 and 15, where the FIGS. 16 and 17 examples use a shorter range of empirical data.

During pre-production, an aircraft production and service methodology may include specification and design of the aircraft 102a-102b and material procurement. During production, component and subassembly manufacturing is performed and system integration of the aircraft 102a-102b takes place. Thereafter, the aircraft 102a-102b may go through certification and delivery in order to be placed in service. While in service by a customer, the aircraft 102a-102b is scheduled for routine work in maintenance and service (that may also include modification, reconfiguration, refurbishment, and so on). Apparatus and methods embodied herein may be employed during one or more suitable stages of the production and service and/or suitable component of aircraft 102a-102b (e.g., an airframe, systems, an interior, a propulsion system, an electrical system, a hydraulic system, and an environmental system). Each process of may be performed or carried out by a system integrator, a third party, and/or an operator (e.g., a customer). For the purposes of this description, a system integrator may include without limitation a number of aircraft manufacturers and major-system subcontractors; a third party may include without limitation a number of vendors, subcontractors, and suppliers; and an operator may be an airline, a leasing company, a military entity, a service organization, and so on.

The aircraft 102a-102b includes an airframe with a plurality of systems and an interior. Examples of the systems include one or more of a propulsion system, an electrical system, electro-mechanical elements, a hydraulic system, and an environmental system. Numbers of other systems may be included. Although an aerospace example is shown, the principles of the disclosure may be applied to other industries, such as the automotive industry.

The generative deviation model may be specific to an operating history of the vehicle 102, and so forms an accurate basis for the remining useful life estimations. In contrast, existing remaining useful life estimation models are applied to systems in a general manner. Such accurate twin-based health state estimation may further enable anomaly detection (e.g., projected future health state significantly differs from observed future states) and lead toward more accurate root cause analysis (e.g., replay observations in calibrated physics-based model to identify root deviations). Embodiments of the disclosure further enable digital-twin vision of zero unscheduled maintenance, on-demand part positioning, adaptive part inspection, opportunistic removal, and replacement recommendations. The prediction system 100 is particularly data-driven, and considers less knowledge of the subsystems in question in order to develop an appropriate deviation model. As such, the prediction system 100 may be applied to systems at different scales, such a single aircraft, typical flight paths, and/or fleets.

Use of the digital-twin simulation model 120a to construct a data-driven and generative deviation model means that the model does not rely on curve fitting of data. Instead, the model learns the deviation dynamics and reproduces such dynamics from a given initial condition. The disclosure provides a method for extrapolating numerically estimated drift and diffusion functions. For the range of data covered by historical data, a cubic spline is used to fit the functions. Outside the historical data range, conditions are presented for choosing between multiple different extrapolation functions.

The detailed description and the drawings or FIGS. are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. A method for remaining useful life prediction comprising:

generating parameter data related to a performance of an electro-mechanical element of a vehicle using one or more sensors, wherein the parameter data is acquired during a historical period;

executing in a processor a digital-twin simulation model of the electro-mechanical element based on one or more estimated operating conditions of the electro-mechanical element to generate simulated behavior data that indicates expected behavior of the electro-mechanical element over time;

generating deviation data that characterizes how the parameter data deviates from the simulated behavior data during the historical period, wherein the deviation data includes a deterministic component and a stochastic component;

generating extrapolated deviation data by extrapolating the deterministic component and the stochastic component of the deviation data forward in time after the historical period;

executing in the processor a deviation model to generate updated deviation data based on the extrapolated deviation data and the simulated behavior data;

generating an updated digital-twin simulation model of the electro-mechanical element based on the updated deviation data;

executing in the processor the updated digital-twin simulation model of the electro-mechanical element based on the one or more estimated operating conditions of the electro-mechanical element to generate updated simulated behavior data that indicates the expected behavior of the electro-mechanical element over time;

calculating a remaining useful life of the electro-mechanical element in response to the updated simulated behavior data and the extrapolated deviation data;

reporting the remaining useful life to a person associated with the vehicle;

comparing the updated simulated behavior data of the electro-mechanical element to one or more replacement thresholds; and based on the updated simulated behavior data of the electro-mechanical element exceeding at least one of the one or more replacement thresholds, outputting a recommendation to service or replace the electro-mechanical element on the vehicle.

2. The method according to claim 1, wherein the historical period spans a plurality of trips of the vehicle.

3. The method according to claim 1, wherein the deterministic component characterizes a drift of the performance of the electro-mechanical element over time, and the stochastic component characterizes a diffusion of the performance of the electro-mechanical element over time.

4. The method according to claim 1, further comprising:

servicing the electro-mechanical element based on the remaining useful life as reported.

5. The method according to claim 1, wherein the vehicle comprises an aircraft.

6. The method according to claim 1, wherein the generating of the extrapolated deviation data comprises:

generating a plurality of extrapolated data sets by extrapolating the deviation data forward in time after the historical period using a plurality of extrapolation techniques; and selecting the extrapolated deviation data from one of the plurality of extrapolated data sets.

7. The method according to claim 6, wherein the selecting of the extrapolated deviation data establishes a plurality of endpoints in the plurality of extrapolated data sets.

8. A prediction system comprising:

one or more sensors configured to generate parameter data related to a performance of an electro-mechanical element of a vehicle, wherein the parameter data is acquired during a historical period; and a processor in communication with the one or more sensors, and configured to:

execute a digital-twin simulation model of the electro-mechanical element based on one or more estimated operating conditions of the electro-mechanical element to generate simulated behavior data that indicates expected behavior of the electro-mechanical element over time;

generate deviation data that characterizes how the parameter data deviates from the simulated behavior data during the historical period, wherein the deviation data includes a deterministic component and a stochastic component;

generate extrapolated deviation data by extrapolating the deterministic component and the stochastic component of the deviation data forward in time after the historical period;

execute in the processor a deviation model to generate updated deviation data based on the extrapolated deviation data and the simulated behavior data;

generate an updated digital-twin simulation model of the electro-mechanical element based on the updated deviation data;

execute in the processor the updated digital-twin simulation model of the electro-mechanical element based on the one or more estimated operating conditions of the electro-mechanical element to generate updated simulated behavior data that indicates the expected behavior of the electro-mechanical element over time;

calculate a remaining useful life of the electro-mechanical element in response to the updated simulated behavior data and the extrapolated deviation data;

report the remaining useful life to a person associated with the vehicle;

compare the updated simulated behavior data of the electro-mechanical element to one or more replacement thresholds; and based on the updated simulated behavior data of the electro-mechanical element exceeding at least one of the one or more replacement thresholds, output a recommendation to service or replace the electro-mechanical element on the vehicle.

9. The prediction system according to claim 8, wherein the vehicle comprises an aircraft, and the historical period spans a plurality of flights of the aircraft.

10. The prediction system according to claim 8, wherein the processor is disposed inside the vehicle.

11. The prediction system according to claim 8, wherein the processor is disposed external to the vehicle.

12. A method for remaining useful life prediction comprising:

generating parameter data related to a performance of an electro-mechanical element of a vehicle using one or more sensors, wherein the parameter data is acquired during a historical period;

executing in a processor a digital-twin simulation model of the electro-mechanical element based on one or more estimated operating conditions of the electro-mechanical element to generate simulated behavior data that indicates expected behavior of the electro-mechanical element over time;

generating deviation data that characterizes how the parameter data deviates from the simulated behavior data during the historical period, wherein the deviation data includes a deterministic component and a stochastic component;

generating a plurality of extrapolated data sets by extrapolating the deterministic component and the stochastic component of the deviation data forward in time after the historical period using a plurality of extrapolation techniques;

selecting extrapolated deviation data from one of the plurality of extrapolated data sets;

executing in the processor a deviation model to generate updated deviation data based on the extrapolated deviation data selected from the one of the plurality of extrapolated data sets and the simulated behavior data;

generating an updated digital-twin simulation model of the electro-mechanical element based on the updated deviation data;

executing in the processor the updated digital-twin simulation model of the electro-mechanical element based on the one or more estimated operating conditions of the electro-mechanical element to generate updated simulated behavior data that indicates the expected behavior of the electro-mechanical element over time;

calculating a remaining useful life of the electro-mechanical element in response to the updated simulated behavior data and the extrapolated deviation data;

reporting the remaining useful life to a person associated with the vehicle;

comparing the updated simulated behavior data of the electro-mechanical element to one or more replacement thresholds; and based on the updated simulated behavior data of the electro-mechanical element exceeding at least one of the one or more replacement thresholds, outputting a recommendation to service or replace the electro-mechanical element on the vehicle.

13. The method according to claim 12, wherein the extrapolated deviation data is fit to the parameter data using a cubic spline technique.

14. The method according to claim 12, wherein the plurality of extrapolation techniques includes:

generating the extrapolated deviation data forward in time by continuing with decay a curve established by the deviation data in the historical period.

15. The method according to claim 12, wherein the plurality of extrapolation techniques includes:

generating the extrapolated deviation data forward in time by asymptotically matching one or more of the deterministic component and the stochastic component to a straight line through the deviation data with a zero slope.

16. The method according to claim 12, wherein the plurality of extrapolation techniques includes:

generating the extrapolated deviation data forward in time by asymptotically matching one or more of the deterministic component and the stochastic component to a straight line through the deviation data with a non-zero slope.

17. The prediction system according to claim 8, wherein the deterministic component characterizes a drift of the performance of the electro-mechanical element over time, and the stochastic component characterizes a diffusion of the performance of the electro-mechanical element over time.

18. The prediction system according to claim 8, wherein the processor is configured to:

service the electro-mechanical element based on the remaining useful life as reported.

19. The method according to claim 12, wherein the deterministic component characterizes a drift of the performance of the electro-mechanical element over time, and the stochastic component characterizes a diffusion of the performance of the electro-mechanical element over time.

20. The method according to claim 12, further comprising:

servicing the electro-mechanical element based on the remaining useful life as reported.

* * * * *